(12) United States Patent
Nogueira-Nine

(10) Patent No.: US 10,140,114 B2
(45) Date of Patent: Nov. 27, 2018

(54) METHOD FOR WIRELESSLY UPDATING FIRMWARE IN A WIDE AREA NETWORK

(71) Applicant: Robert Bosch GmbH, Stuttgart (DE)

(72) Inventor: Juan Nogueira-Nine, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/549,630

(22) PCT Filed: Jan. 27, 2016

(86) PCT No.: PCT/EP2016/051674
§ 371 (c)(1),
(2) Date: Aug. 8, 2017

(87) PCT Pub. No.: WO2016/131626
PCT Pub. Date: Aug. 25, 2016

(65) Prior Publication Data
US 2018/0024828 A1    Jan. 25, 2018

(30) Foreign Application Priority Data
Feb. 17, 2015   (DE) .................... 10 2015 202 791

(51) Int. Cl.
*G06F 8/65* (2018.01)
*H04W 8/24* (2009.01)
(Continued)

(52) U.S. Cl.
CPC ............... *G06F 8/65* (2013.01); *G06F 8/654* (2018.02); *H04B 1/715* (2013.01);
(Continued)

(58) Field of Classification Search
CPC ...... H04W 8/245; H04W 24/02; H04L 67/12; H04L 27/12; H04L 27/10; H04L 67/34;
(Continued)

(56) References Cited

U.S. PATENT DOCUMENTS 8,209,676 B2 * 6/2012 Kapadekar ............... G06F 8/65
717/171
8,893,110 B2 * 11/2014 Kapadekar ............... G06F 8/65
717/171
(Continued)

OTHER PUBLICATIONS

Alberto Bielsa, "Smart Parking and environmental monitoring in one of the world's largest WSN" Feb. 22, 2013, total pp. 7, retrieved from <http://www.libelium.com/smart_santander_smart_parking/> (Year: 2013).*

(Continued)

*Primary Examiner* — Marina Lee
(74) *Attorney, Agent, or Firm* — Norton Rose Fulbright US LLP; Gerard Messina

(57) ABSTRACT

Executing a FOTA (firmware over the air) method in a LoRa network having low throughput and low power. the transceivers used in the end nodes and in the LoRa gateway are capable of selecting a certain frequency channel and deactivating the LoRa mode. If the spread-spectrum LoRa mode is deactivated, both transceivers at the end node and the gateway function instead using a basic FSK (frequency-shift keying) modulation scheme. This modulation scheme is capable of providing a higher data rate at the expense of reducing the "path balance," which indicates how much attenuation the transmitted signal may sustain while still being able to be decoded at the receiver. When using the FSK modulation scheme at a high data rate, a FOTA method may be easily carried out, since the end node must have its receiver activated only for a short time.

6 Claims, 1 Drawing Sheet

(51) Int. Cl.
*H04B 1/715* (2011.01)
*G06F 8/654* (2018.01)
*H04L 29/08* (2006.01)
*H04L 12/64* (2006.01)
*H04W 24/02* (2009.01)
*H04L 27/12* (2006.01)

(52) U.S. Cl.
CPC .......... *H04L 12/6418* (2013.01); *H04L 67/34* (2013.01); *H04W 24/02* (2013.01); *H04B 2201/713* (2013.01); *H04L 27/12* (2013.01); *H04L 67/12* (2013.01); *H04W 8/245* (2013.01)

(58) Field of Classification Search
CPC ....... H04L 12/6418; G06F 8/65; G06F 8/654; H04B 2201/713; H04B 1/715
USPC .......................................... 717/168, 173, 178
See application file for complete search history.

(56) References Cited

U.S. PATENT DOCUMENTS

| | | | | |
|---|---|---|---|---|
| 9,400,192 | B1* | 7/2016 | Salser, Jr. | G01D 4/002 |
| 9,929,771 | B2* | 3/2018 | Rose | H04B 1/44 |
| 9,929,772 | B2* | 3/2018 | Rose | H04B 1/44 |
| 2007/0258508 | A1* | 11/2007 | Werb | H04W 84/18 |
| | | | | 375/140 |
| 2008/0061948 | A1* | 3/2008 | Perez | G05B 19/042 |
| | | | | 340/12.32 |
| 2010/0135201 | A1* | 6/2010 | Lewis | G06F 8/65 |
| | | | | 370/328 |
| 2011/0314462 | A1* | 12/2011 | Clark | G06F 8/65 |
| | | | | 717/169 |
| 2012/0094643 | A1* | 4/2012 | Brisebois | H04W 8/245 |
| | | | | 455/418 |
| 2012/0201315 | A1* | 8/2012 | Zhang | H04L 1/0046 |
| | | | | 375/260 |
| 2013/0241744 | A1* | 9/2013 | Erdos | H04Q 9/00 |
| | | | | 340/870.02 |
| 2014/0177469 | A1* | 6/2014 | Neyhart | H04L 12/2807 |
| | | | | 370/254 |
| 2014/0242931 | A1* | 8/2014 | Seely | H04L 27/0008 |
| | | | | 455/207 |
| 2018/0024828 | A1* | 1/2018 | Nogueira-Nine | G06F 8/65 |

OTHER PUBLICATIONS

International Search Report for PCT/EP2016/051674, dated Apr. 28, 2016.
"Smart City project in Santander to monitor Parking Free Slots : Libelium", Feb. 22, 2013 (Feb. 22, 2013), XP055266302.
"LoRa Gateway tutorial : Libelium", Dec. 4, 2014 (Dec. 4, 2014), XP55265566.
"Waspmote Over the Air Programming (OTAP)with 802.15.4 / ZigBee / 3G / GPRS : Libelium", Oct. 22, 2014 (Oct. 22, 2014), pp. 1-4, XP55265531.
"SX1272/73-860-1050 MHz Ultra Low Power Long Range Transceiver", Jul. 11, 2012 (Jul. 11, 2012), XP55265496.
"Waspmote Technical Guide", Jun. 1, 2014 (Jun. 1, 2014), pp. 1-175, XP55265591.
"Extreme Range Links: LoRa 868 / 915MHz SX1272 Module for Arduino, Raspberry Pi and Intel Galileo", Feb. 10, 2015 (Feb. 10, 2015), pp. 1-17, XP55265505.

* cited by examiner

METHOD FOR WIRELESSLY UPDATING FIRMWARE IN A WIDE AREA NETWORK

FIELD OF THE INVENTION

The present invention describes a method for providing firmware updates wirelessly (FOTA—Firmware Over-The-Air) for embedded nodes in a wide area network having low throughput.

BACKGROUND INFORMATION

Conventional wireless communication standards have been configured for low (hundreds of kbps), medium (several Mbps), high (tens of Mbps), and very high (hundreds of Mbps) data rate transmissions, as the objective was to transmit medium and large data quantities in short periods.

The emergence of what is known as the Internet of Things (IoT) on the consumer electronics market has triggered the demand for wireless approaches including low power, low throughput, low power consumption, and long range, also known as LPWAN (Low Power Wide Area Network). The requirements for these network approaches include:

Low throughput: most IoT devices require data rates of only a few hundred bps up to a few tens of kbps.

Low power consumption: similar to the conventional close-range approaches using low power, for example, ZigBee.

Low cost: prices for the transceiver in the range of 3 to 2 U.S. dollars

Long range: no hops, i.e., no intermediate node between the end node and the gateway to the Internet, and the option of deploying as a wide area network (WAN).

None of the aforementioned conventional wireless communication standards is able to meet these four requirements simultaneously. Cellular radio approaches such as GPRS cover a wide range and offer low throughput, but are neither economical nor low-power. Technologies based on IEEE 80215.4 such as ZigBee, 6LowPAN, or Thread are not always able to provide zero hops up to the gateway. Technologies based on IEEE 802.11x meet none of these requirements.

In order to bridge this technology gap, new versions of mature, wireless technologies such as ultra-narrow band/spread-spectrum were developed. Examples of these technologies include LoRa or SigFox for spread-spectrum or ultra-narrow band. Both technologies are capable of providing a very long range and are therefore suitable for deployment as wide area networks having a cellular radio topology. In addition, both technologies are capable of providing a long range while using low transmission power and employing economical transceiver architectures.

SUMMARY OF THE INVENTION

The present invention relates to the spread-spectrum LoRa technology (LoRa™ from Semtech), and a network of IoT devices constructed using LoRa as a wireless communication arrangement. A LoRa network is typically made up of three elements:
1. at least one IoT end node which includes an economical LoRa transceiver
2. a LoRa gateway which includes a high-power, multichannel LoRa transceiver
3. a network control unit (NCU) which manages the LoRa network.

The LoRa technology is highly flexible and is able to adjust the provided data rate to the variable distances between the end node and the gateway. This is carried out by selecting the applicable spread factor (SF) to be used, which determines the time required for transmitting the data: the greater the SF is, the longer the achievable range is, but also the longer the time required for transmitting each information bit is, and thus the energy used in the communication procedure.

The low data rate provided by a LoRa network prevents the end nodes from implementing a mechanism for wirelessly updating their embedded firmware. This method is known as FOTA (Firmware Over-The-Air), and is a highly important feature in the present consumer electronic devices. This firmware update method allows the device manufacturer to reduce its product rollout time by starting to sell its product even if the full range of planned functionality is not completely available. Such additional functions or other completely new features are available with a firmware update. Furthermore, it gives the manufacturer the opportunity to remedy errors in the software components; therefore, a product recall may be avoided and/or repair and maintenance costs may be reduced. If the firmware update is to be carried out wirelessly and the data rate is very low/ultra-low, the size of the firmware may complicate or even completely prevent the use of a FOTA method. For example, in the EU, regulations limit the transmission time to a duty cycle of 1% per hour in the 868 MHz band for close-range devices, if the LBT (Listen Before Talk) protocol is not used, which is normally the case with low-power devices, in order not to waste energy. This corresponds to 36 seconds of transmission time per hour. Furthermore, assuming an average firmware size in embedded devices of approximately 100 kB and a low data rate of 1 kbps for completely receiving a new firmware version, the end node would need to have its radio device switched on for around 15 minutes (including communication protocol overhead). Since the end node is able to use its transmitter for only 36 seconds per hour, the full FOTA method requires more than one day.

However, the main problem with this method is not the time which is required by the FOTA method, but rather the energy used by activating the radio receiver for the required period in an embedded system which is configured to be operated with batteries for several years.

The present invention provides an approach for carrying out a FOTA method in a LoRa network having low throughput and low power. It is assumed that the LoRa transceivers used in the end nodes and the transceiver used in the LoRa gateway are capable of selecting a certain frequency channel and deactivating the LoRa mode. If the spread-spectrum LoRa mode is deactivated, both transceivers at the end node and at the gateway function using a basic FSK (frequency-shift keying) modulation method. This modulation method is typically capable of providing a data rate of up to around 250 kbps, at the expense of reducing the "path balance" between the transmitter and receiver, which determines how much attenuation the transmitted signal may sustain while still being able to be decoded at the receiver. The path balance is typically reduced by an amount of between 8 dB, in comparison to the LoRa mode having the shortest spread factor, up to 20 dB in comparison to the LoRa mode having the longest spread factor.

When using the FSK modulation scheme at a high data rate, a FOTA method may be easily carried out, since the end node must have its receiver activated only for a short time. For example, using the figures from the aforementioned example and a 250 kbps FSK data rate, the transfer of the complete firmware will take less than four seconds.

Due to the inversely proportional dependence of the radio range on the square of the distance, the reduction in the path balance unfortunately means a large reduction in the range. Using the well-known rule of thumb that every 6 dB gained in the path balance doubles the achievable range, changing from the LoRa mode to FSK modulation will cause a reduction in the achievable range by a factor of 2 to 8. This means that when changing to FSK modulation, a FOTA method will be successful only using nodes which are present within the FSK range.

In order to solve this problem, it is provided with the aid of the present invention to select another channel in the corresponding frequency band, where the allowable transmission power is much higher than in the LoRa operating channels. This is, for example, possible in Europe in the 868 MHz band, where the operational LoRa channels are limited by a maximum transmission power of 14 dBm, but a channel may operate at up to 27 dBm. This constitutes a path balance gain of at least 13 dB, which would again increase the reduced range due to the FSK modulation by a factor of four. This does not compensate fully for the lost path balance if the longest spread factor (SF12) is taken into account, but does so for the shorter spread factors (see Table 1).

TABLE 1

| LoRa spread factor | Path balance difference with respect to FSK |
| --- | --- |
| SF7 | 5 dB |
| SF8 | 8 dB |
| SF9 | 11 dB |
| SF10 | 14 dB |
| SF11 | 16 dB |
| SF12 | 20 dB |

The operational LoRa channels in the U.S. in the 920 MHz band are also limited to a maximum transmission power of 22 dBm, but one channel may be operated at up to 27 dBm. This limit is increased up to 30 dB by using a frequency hopping method.

DETAILED DESCRIPTION

Figure 1:
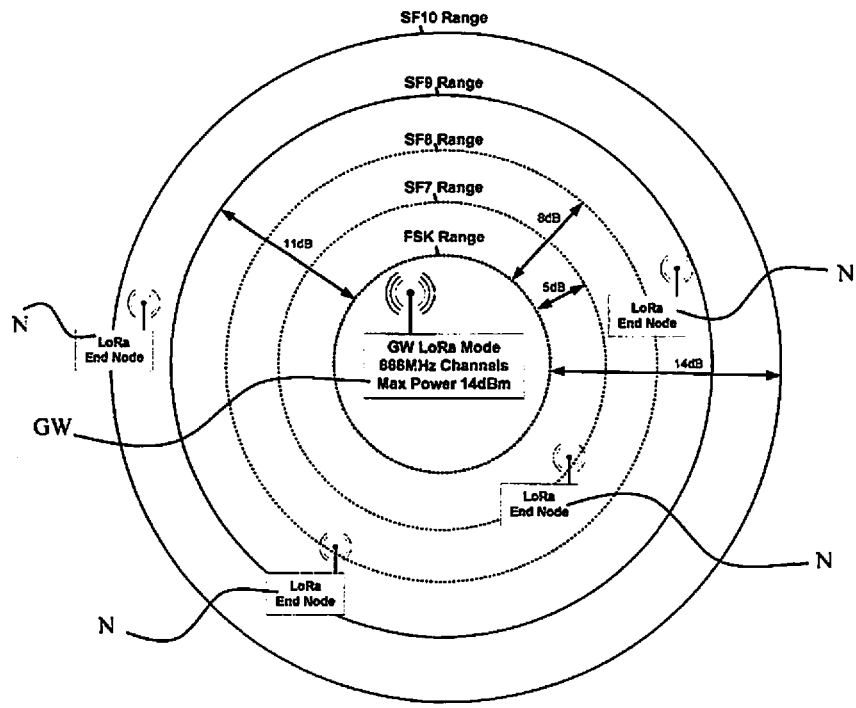
FIG. 1 shows a Lora network.

In one possible specific embodiment of the present invention, the end nodes are parking sensors which are able to detect whether a parking space is vacant or occupied. The piece of information about a change in the state of a parking space is communicated by the parking sensor by transmitting a LoRa message including the corresponding piece of information. This LoRa message must be received by the LoRa gateway, which in turn transmits the information with the aid of an IP (Internet) connection to the parking management application. If a new firmware version for the parking sensors is available and must be installed, the gateways begin the following method:

a) notifying the parking sensors using the LoRa communication mode that a new firmware version is available and that the FOTA method will be started at some point in time. In order to avoid collisions, gateways which are within range of one another will put the update method into operation in sequence. The sequence is decided by the NCU and communicated to each gateway. The notification includes the frequency channel which will be used for the firmware update, the firmware size, the number of data packets which are used for transmitting the complete firmware, and the maximum time which the complete firmware download will require.

b) Each parking sensor will have to confirm the reception of this piece of information. The network control unit (NCU), which manages the network operation, will check that all parking sensors have confirmed the reception of the FOTA method.

c) The NCU downloads the new firmware to the gateways, this firmware being stored in the memory of the gateways.

d) At the stipulated point in time, the parking sensors deactivate the LoRa mode, switch the transceivers to FSK modulation in the indicated channel, and activate their receivers.

e) At the same time, the gateways also switch in the predetermined sequence to an FSK modulation mode in the selected channels and begin transmission of the new firmware. The firmware will have to be segmented and packetized into small data blocks as a function of its size. A sequence number is then added to each data packet in order to support the reassembly of the data on the end-node side. The sequence number will also be helpful should some data packets have to be repeated.

f) The parking sensors monitor each received packet and create a list containing the missing sequence numbers of lost packets, if necessary.

g) As soon as the package having the expected last sequence number has been received, or the maximum download time has elapsed, the parking sensor end node is reset to its normal LoRa mode and transmits a LoRa packet in order to inform the NCU about the success or failure of the FOTA method. If the method has failed, the parking sensor transmits a list of missing data packets. As a function of the size of the missing portions of the firmware, the NCU will decide whether it is to resend the data packets with the missing sequence numbers using the LoRa mode, or, if the data quantity is large, the FOTA method is to be restarted, but now using a point-to-point method, which means addressing only certain parking sensor nodes for repeating the FOTA method.

h) If the NCU has received a notification about the success of the download process from all affected parking sensors, it will signal to them to carry out the update method at a given point in time.

i) Finally, if the parking sensor end nodes restart with the execution of the new firmware version, the NCU is informed with the aid of a LoRa data packet which includes the firmware version.

It is clear to those skilled in the art that this method may also be easily applied to other IoT applications having a LoRa network architecture where regular wireless firmware updates for end nodes are desirable. As in the aforementioned example, end nodes may be spatially fixed or may be mobile devices.

It is important to note here that the FSK mode should not be used in the normal operating mode at 27 dBm to extend the range, since this means that the end nodes would also have to use the same transmission power, which will not be possible due to power consumption issues, as the battery life will be considerably shortened. However, the LoRa gateway is network-dependent.

In order to be able to use the FOTA method described in the present invention, the network should be correspondingly deployed as a function of the types of end nodes used:

In LoRa networks with spatially fixed end nodes, the range covered by each gateway should be assessed to include only those end nodes having LoRa spread factors, for which the reduction in the path balance caused by the deactivation of the LoRa mode could be regained via a corresponding increase in the transmission power of the gateway.

In the case of mobile LoRa devices, the FOTA method is carried out only if the end node is situated close enough to a gateway to be accessible within the range provided by the FSK path balance.

Figure 2:
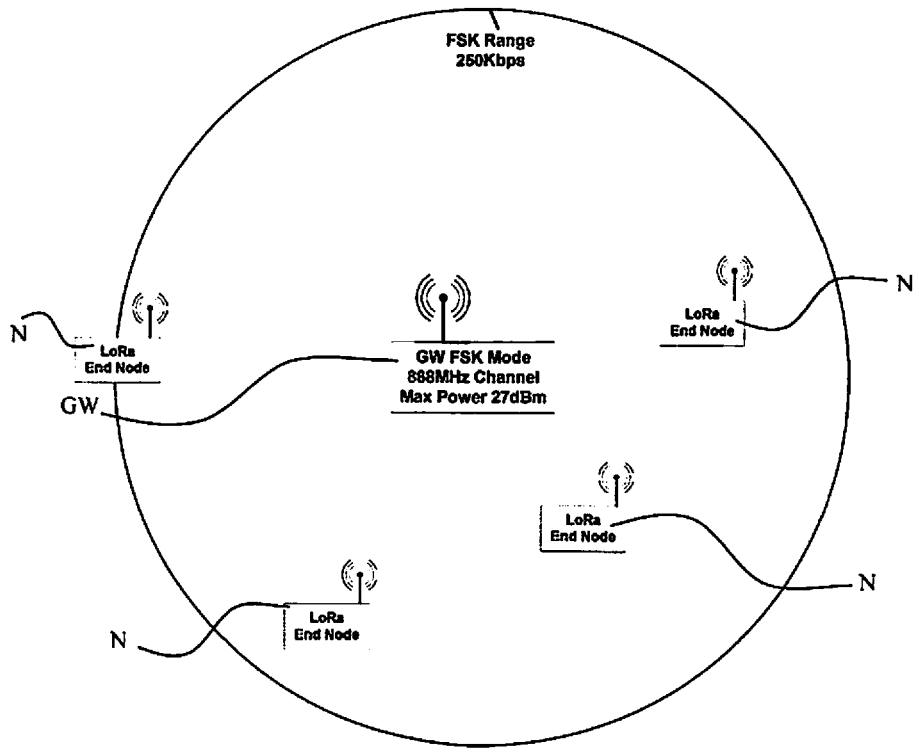
FIG. 2 shows the case if the end nodes and the gateway are prepared to carry out the method according to the method of the present invention, in which they switch to the selected channel in the 868 MHz frequency band, in which a transmission power of 27 dBm is allowable.

The present invention may be used in any device or end node subscribing to a LoRa network, like those shown used in FIG. 1. In this figure, gateway GW as well as the end nodes are operated using the LoRa mode having different spread factors as a function of their respective distance from LoRa gateway GW. In this operating mode, the maximum allowable transmission power is 14 dBm, and the range provided via the FSK modulation having such transmission power is also indicated. The differences in the achievable range between each spread factor and the FSK modulation are also provided in dBs as according to Table 1. If the end nodes and the gateway are prepared to carry out the method according to the method of the present invention, they switch to the selected channel in the 868 MHz frequency band, in which a transmission power of 27 dBm is allowable; see FIG. 2. The end nodes are also tuned to this channel in receive mode. At the higher transmission power of 27 dBm, the signal transmitted via the gateway using an FSK modulation method and a high data rate (for example, 250 kbps), as indicated in FIG. 2, will achieve the same range as the SF10 in FIG. 1. In this mode, the new firmware may be installed in a very short transmission time, and therefore the end nodes must have their receivers switched on for only a very brief period, which may be up to more than 150 times shorter, thus saving a great deal of energy in comparison to carrying out the same method in a LoRa mode having a lower data rate.

What is claimed is:

1. A method for providing wireless firmware over the air (FOTA) updates in a long-range (LoRa™) network, the method comprising:

selecting, via transceivers used in at least one end node and a transceiver in a LoRa™ gateway, a certain frequency channel, wherein the LoRa™ network includes the at least one end node and at least one gateway, the at least one end node including the transceivers and the LoRa™ gateway including its transceiver;

activating or deactivating, via the transceivers in the end nodes and the transceiver in the LoRa™ gateway, the LoRa™ mode, wherein the LoRa™ mode is deactivated in the gateway and in the end nodes if a firmware update is to be transferred to the end nodes;

wherein a FOTA mode acting via a frequency shift keying (FSK) modulation scheme is activated in the transceivers on the end node and the transceiver on the gateway, and a wireless firmware update is prepared by the gateway for the end nodes, wherein the LoRa™ transceiver used in the end node and the transceiver used in the LoRa™ gateway can select a certain frequency channel and deactivate the LoRa™ mode, and wherein when the spread-spectrum LoRa™ mode is deactivated, the transceiver at the end node and the transceiver at the gateway function use the FSK modulation scheme.

2. The method of claim 1, wherein the firmware update mode acts in a selected frequency channel which differs from the frequency channel of the LoRa™ mode, the allowable transmission power in the frequency channel selected for the firmware update mode being higher than in the LoRa™ operating channels.

3. The method of claim 1, wherein the end nodes are spatially fixed end nodes, and the range covered by each gateway is assessed to include only those end nodes having LoRa™ spread factors, for which the reduction in the path balance caused by the deactivation of the LoRa™ mode is regained via a corresponding increase in the transmission power of the gateway.

4. The method of claim 3, wherein the end nodes are parking sensors which detect whether a parking space is vacant or occupied.

5. The method of claim 4, further comprising:

a) notifying the parking sensors using the LoRa™ communication mode that a new firmware version is available, and that the FOTA task will be started at some point in time; gateways which are within range of one another starting the update method in sequence; the sequence being decided by a network control unit (NCU) which manages the network operation, and being communicated to each gateway; the notification including the frequency channel which is used for the firmware update, the firmware size, the number of data packets which are used for transmitting the complete firmware, and the maximum time which the complete firmware download will require;

b) each parking sensor will confirm the reception of the piece of information according to task a), and the network control unit (NCU) checks that all parking sensors have confirmed the reception;

c) the NCU downloads the new firmware to the gateways, this firmware being stored in the memory of the gateway;

d) at the stipulated point in time, the parking sensors deactivate the LoRa™ mode, switch their respective transceiver to FSK modulation in the indicated channel, and activate their receivers;

e) the gateways, following the predetermined sequence, switch to an FSK modulation mode in the selected channels, and begin transmission of the new firmware; the firmware being divided and packetized into separate data blocks as a function of the firmware size, and a sequence number being added to each data packet;

f) the parking sensors monitor each received packet and create a list including the missing sequence numbers of lost packets, if any;

g) as soon as the packet having the expected last sequence number has been received, or if a predefined maximum download time has elapsed, each parking sensor end node resets to its normal LoRa™ mode and transmits a LoRa™ packet to inform the NCU about the success or failure of the FOTA method; and if the method has failed, the parking sensor transmits a list of sequence numbers of lost packets;

h) if the NCU has received a notification about the success of the download method from all affected parking sensors, it signals the parking sensors to carry out the update method at a given point in time;

i) if the parking sensor end nodes restart with the execution of the new firmware version, each parking sensor informs the NCU with the aid of LoRa™ data packet which includes the firmware version.

6. The method of claim 1, wherein the end nodes are mobile LoRa™ devices, and the FOTA method is carried out only if the end node is situated close enough to a gateway to be accessible within the range provided by the FSK path balance.

* * * * *